United States Patent
Coope

[15] 3,666,279
[45] May 30, 1972

[54] COLLET CLOSING MECHANISM FOR A MACHINE TOOL

[72] Inventor: Robert L. Coope, 1830 West Virginia Avenue, Phoenix, Ariz. 85007

[22] Filed: Sept. 8, 1970

[21] Appl. No.: 70,110

[52] U.S. Cl..............................279/50, 279/1 F, 279/51
[51] Int. Cl...............................................B23b 31/20
[58] Field of Search...............279/1 B, 1 F, 41, 43, 51, 53, 279/50

[56] References Cited

UNITED STATES PATENTS

| | | | |
|---|---|---|---|
| 1,864,786 | 6/1932 | Wilkins | 279/51 |
| 2,252,839 | 8/1941 | Drisser | 279/1 F |
| 2,375,115 | 5/1945 | Kylin | 279/41 X |

*Primary Examiner*—Gil Weidenfeld
*Attorney*—Drummond, Cahill & Phillips

[57] ABSTRACT

In order to pull a split collet into the work holding position and to permit rapid release of a work piece, a toggle mechanism is utilized to apply a closely regulated force to the collet to move it in the appropriate longitudinal direction. The collet is inserted into the forward end of a spindle having an axial bore and a draw tube is inserted into the opposite end of the spindle and is threaded onto the collet in the usual manner. After the workpiece is inserted, the toggle mechanism is activated to pull the draw tube, and hence the collet, slightly rearwardly such that an external taper on the collet is brought into contact with an internal taper on the spindle to tighten the collet onto the work piece. When the machining operation is completed on the work piece, the toggle mechanism is operated in the opposite direction to release the collet from the internal taper such that it can expand and release the work piece. The toggle mechanism includes a closer sleeve which can be moved rearwardly and forwardly by a lever. The closer sleeve fits slidably over the rear portion of the draw tube and is provided with three cam surfaces extending generally outwardly and rearwardly from the periphery of its axial bore. A back plate, which is secured to the draw tube behind the closer sleeve, has the captive ends of three forwardly directed toggle links pivotally secured within forwardly opening recesses. The free ends of the toggle links are provided with rollers which function as cam followers on the cam surfaces of the closer sleeve. A stationary stop disposed forward of the closer sleeve has a rearwardly extending hub portion which functions as a part of the cam surfaces the rollers follow. The rollers and the cam surfaces cooperate such that when the closer sleeve is moved to the rear, closed position, the rollers force the toggle links into an attitude parallel to the draw tube axis thereby forcing the back plate, and hence the draw tube and collet, slightly rearwardly. When the closer sleeve is moved to the forward, open position, the rollers are forced radially outwardly to pull the back plate, and hence the draw tube and collet, slightly forward to release the collet. Radiused points on the cam surfaces bring about the toggle action during the opening and closing operation to insure a self-locking characteristic to the mechanism.

3 Claims, 5 Drawing Figures

INVENTOR.
ROBERT L. COOPE
BY
Drummond, Cahill & Phillips
ATTORNEYS

INVENTOR.
ROBERT L. COOPE
BY
Drummond, Cahill & Phillips
ATTORNEYS

COLLET CLOSING MECHANISM FOR A MACHINE TOOL

This invention relates to the tool arts, and more particularly, to means for rapidly tightening and loosening a split collet in a hollow spindle to correspondingly clasp and release a work piece in the collet.

As is well known in the art, split collets are utilized within hollow spindles by providing some means for pulling the collet rearwardly in order to bring an external taper on the collet into contact with an internal taper on the spindle to close the collet around the work piece. To release the work piece, the collet is moved slightly forwardly such that it can expand to release the work piece. The means for pulling the collet into the hollow spindle often takes the form of a draw tube inserted into the rearward end of the spindle for threaded engagement with the end of the collet within the spindle. Tightening the draw tube serves to close the collet because of the aforementioned coacting tapers. However, to release the collet, it is necessary to loosen the draw tube and sometimes additionally a blow must be delivered to the draw tube before the collet will move forward into the released position. Apparently, the longitudinal force developed in the collet opening direction arising from the coaction of the tapers is not always sufficient to break the static friction of the collet in the spindle. For production work in which the same collet is used repeatedly for holding successive work pieces, the process of tightening and loosening the collet can be a serious impediment to achieving a high piece rate.

Lever operated, quick opening and closing mechanisms for machine tools utilizing collets have been proposed and utilized in the prior art to achieve a less time consuming work piece changing operation. However, the prior art lever operated collet actuating mechanisms of the prior art of which I am aware have been somewhat complicated and less rigid and sure in action than is desirable in meeting modern requirements to precision tooling.

It is therefore a broad object of this invention to provide improved apparatus for actuating a collet in a machine tool spindle.

It is another object of this invention to provide such apparatus which is lever operated and toggles positively into its alternative positions.

It is still another object of this invention to provide such apparatus which is relatively simple in construction and reliable and accurate in operation.

Briefly, in accordance with a presently preferred embodiment of the invention, a lever operated toggle mechanism is utilized to move the draw tube, which is threaded onto the collet, slightly forwardly and rearwardly to release or clasp a work piece in the collet because of the cooperating external taper of the collet and internal taper of the spindle. Three toggle links are pivotally secured to a back plate which is fixed to the draw tube. The free ends of the toggles follow cam surfaces in a closer sleeve which is actuated by a lever. The cam surfaces force the toggle links to move about their pivot points to slightly shorten or lengthen the longitudinal component of their free ends which results in a slight longitudinal change in position of the draw tube. The contours of the cam surfaces result in a toggle action imparting a self-locking characteristic to the mechanism.

The subject matter of the invention is particularly pointed out and distinctly claimed in the concluding portion of the specification. The invention, however, both as to organization and method of operation, may best be understood by reference to the following description taken in connection with the accompanying drawing of which:

Figure 1:
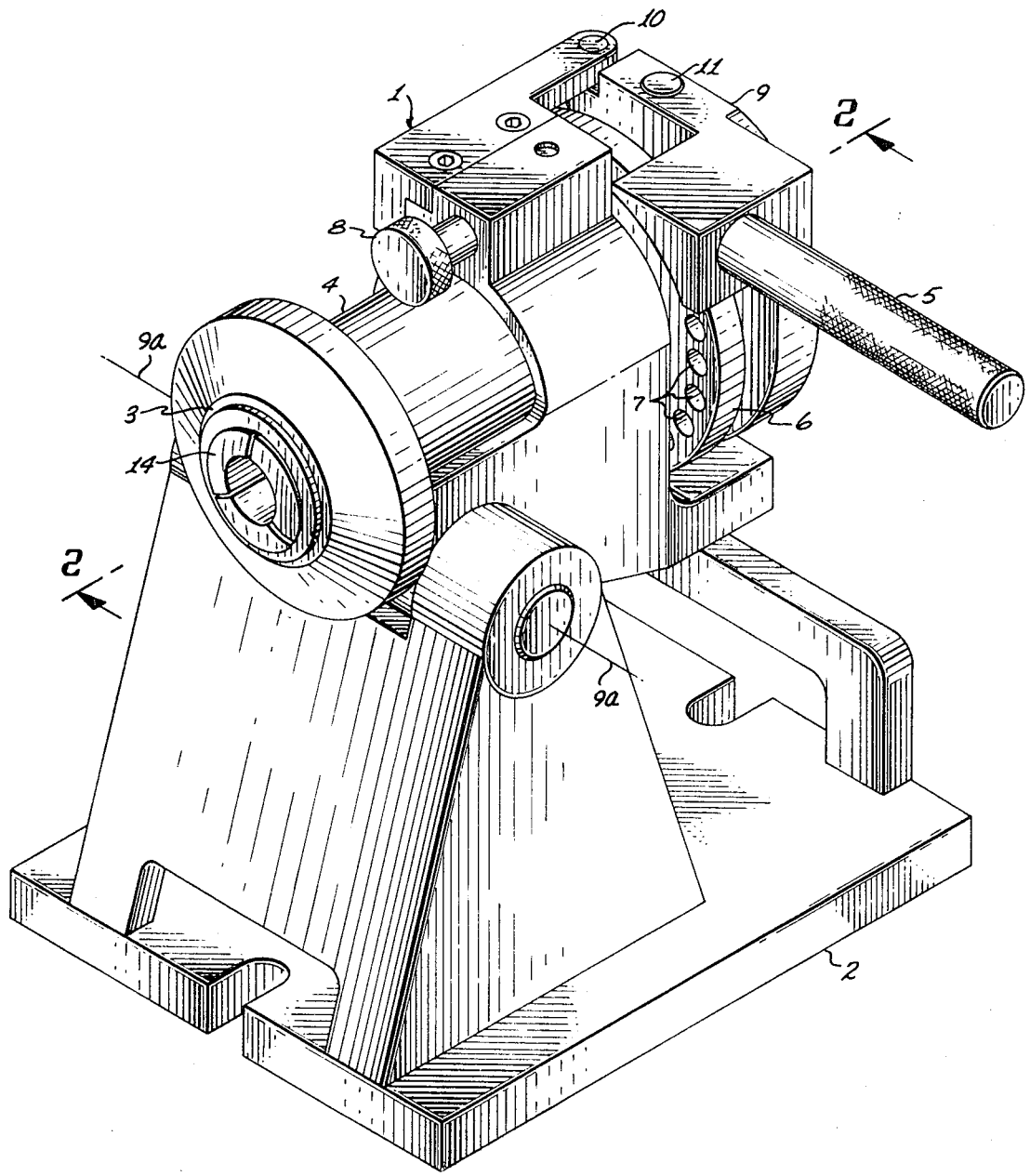
FIG. 1 is a perspective view of spindle housing machine tool apparatus incorporating the present invention.

Referring now to FIG. 1, a typical assembly in which the present invention may be advantageously presented consists generally of a machine tool spindle housing 1 pivotally supported on a base member 2. The spindle housing 1 includes a spindle 3 for holding a conventional machine tool collet. The spindle 3 is journalled within the frame 4 of the spindle housing 1 and extends rearwardly for coupling with the quick release mechanism which is activated by a lever 5. An index wheel 6 is concentrically fixed to the spindle 3 and is provided with circumferentially disposed apertures 7 which may be rotated into engagement with a spring loaded indexing plunger 8 to fix the angular position of the spindle 3 in order to carry out a predetermined machining operation. The spindle housing 1 may be pivoted about an axis 9a on the base 2 in order to adjust the vertical position of the spindle 3. The angular inclination is secured by locking means disposed opposite the view presented and therefore not shown in FIG. 1.

Referring concurrently to FIGS. 1, 2, 3, and 4, it will be observed that the lever 5 pivots an actuating assembly 9 about a pivot point 10. Inwardly directed pins 11 and 12 depending from the actuating assembly 9 engage a circumferential groove in a closer sleeve 13 which, as will become more readily apparent as the description proceeds, is moved longitudinally forwardly and rearwardly to actuate the mechanism.

Figure 2:
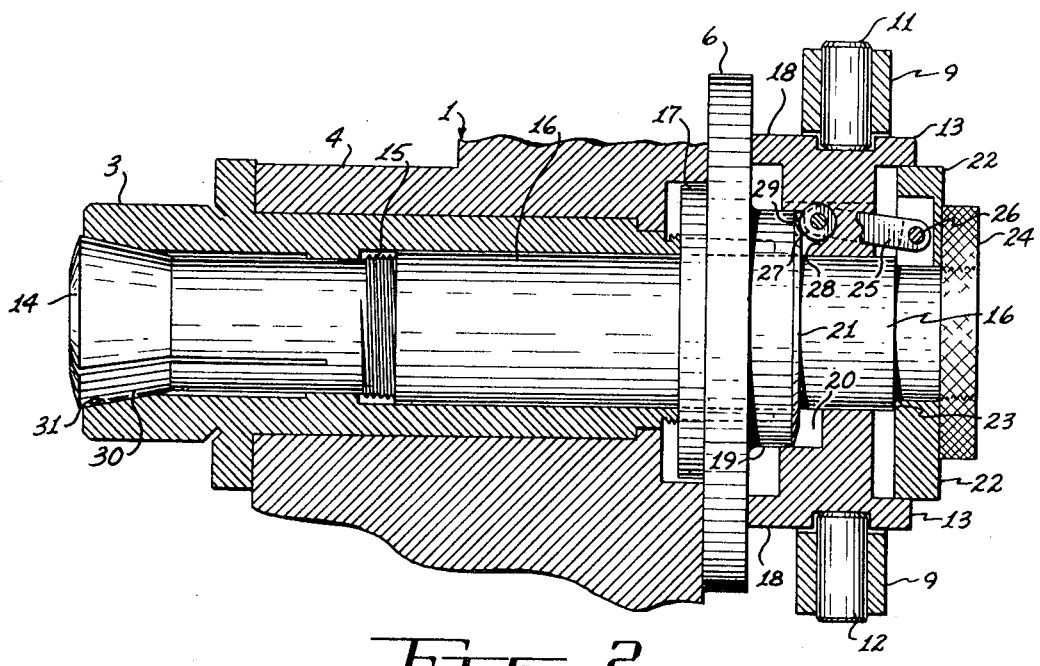
FIG. 2 is a view, partly in cross-section, taken along the line 2—2 of FIG. 1 with the mechanism shown in the collet released position.

Referring now to FIG. 2, the relationship of the collet and spindle to the quick release mechanism is shown. A hollow spindle 3 contains a split collet 14 which is provided with threads 15 at its rearward end. A draw tube 16 is inserted into the rear opening of the spindle 3 and is provided with internal threads at its forward end for threaded engagement with the collet 14. A nut plate 17 is threaded onto the rearward portion of the spindle 3, and the index wheel 6 is secured to the nut plate by means of a plurality of longitudinally extending bolts (not shown). It will be observed that, in the open position depicted in FIG. 2, a forward projecting annular portion 18 of the closer sleeve 13 abuts the index wheel 6 and therefore functions as a stop. A generally cylindrical hub portion 19 of the index wheel 6 extends rearwardly into a circumferential recess 20 in the closer sleeve 13. The hub portion 19 of the index wheel 6 includes a rearmost reduced diameter terminus forming one boundary of frusto-conical area 21 which functions as a portion of a cam surface to be described below.

Figure 4:
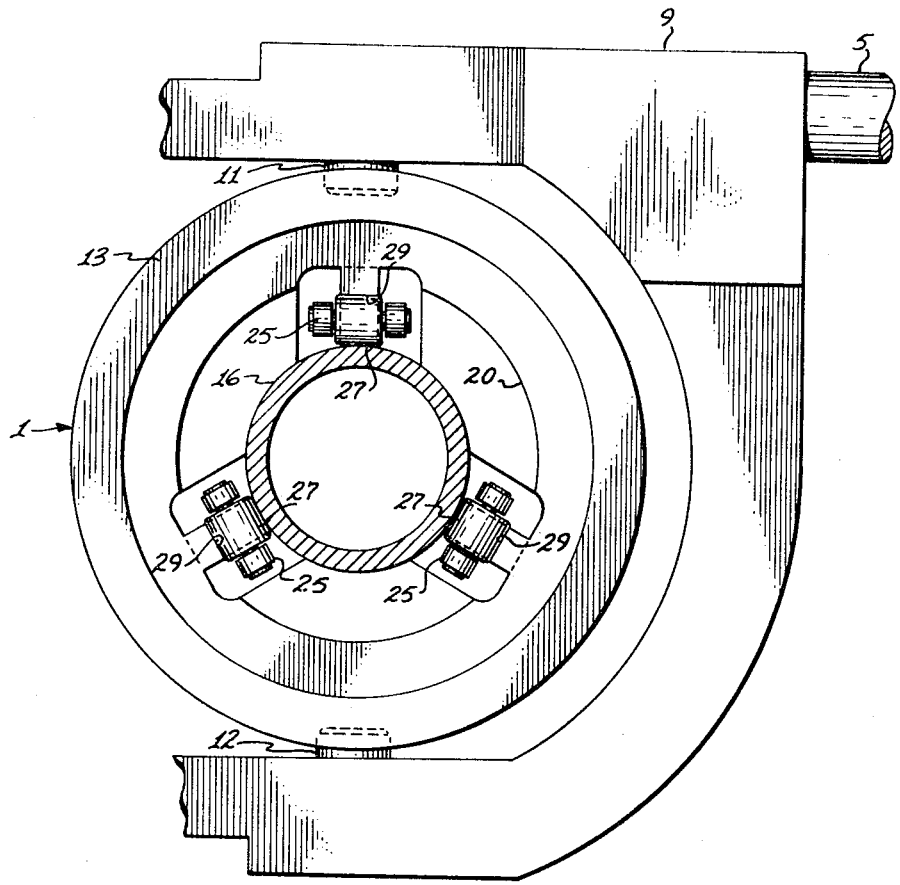
FIG. 4 is a cross-sectional view taken along the line 4—4 of FIG. 3.
Figure 5:
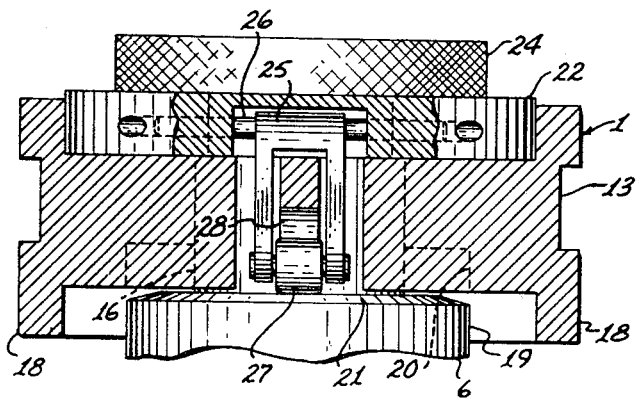
FIG. 5 is a cross-sectional view taken along the line 5—5 of FIG. 3.

A back plate 22 is secured against the circumferential shoulder 23 of the draw tube 16 by a nut 24 threaded onto the draw tube. As best shown in FIGS. 4 and 5, three toggle links 25 are fixed to the back plate 22 and are circumferentially spaced at 120° increments. Referring in particular to FIG. 5, each toggle link 25 has a fixed end pivotally secured to the back plate 22 by means of a hinge pin 26. The free ends of the toggle links 25 are each provided with rollers 27, each with an axis parallel to the corresponding hinge pin 26.

Figure 3:
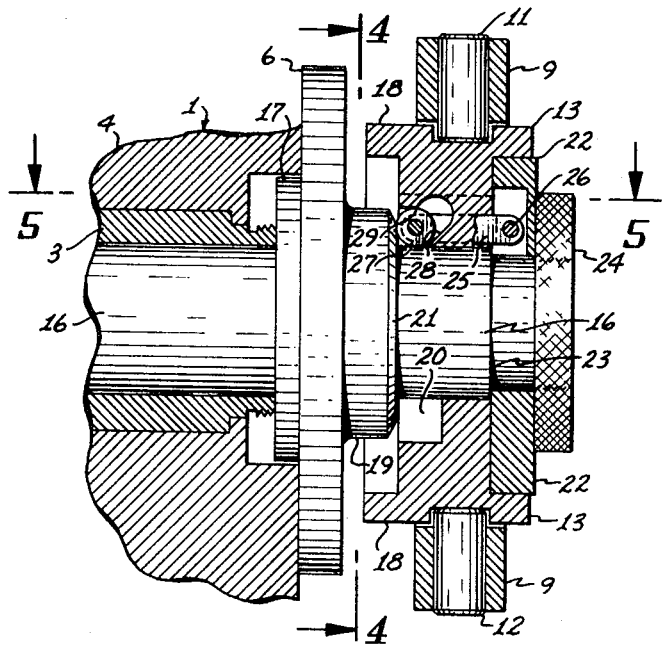
FIG. 3 is a detail of the mechanism depicted in the collet closed position.

With the mechanism assembled, the rollers 27 of the toggle links 25 are surrounded by a cam surface comprising the rear face and frusto-conical areas of the hub 19 of the index wheel 6 and a specially machined contour 28 extending generally radially outwardly from the bore of the closer sleeve 13. As best shown in FIG. 3, the contour of the machined cam surface 28 includes a radially outermost arcuate portion, a first straight portion extending from the forwardmost terminus of the arcuate portion and disposed parallel to the axis of the closer sleeve 13, and a second straight portion extending downwardly and forwardly from the rearmost terminus of the arcuate portion to the closer sleeve bore.

As previously indicated, FIG. 2 illustrates the apparatus in the open position in which the jaws of the collet 14 are sprung slightly radially outwardly to permit insertion of a stock work piece in the usual manner. In this position, the rollers 27 are in their radially outermost position occupying the arcuate portion of the cam surfaces which may be the same diameter as the rollers or larger. In an alternative configuration (not shown) the radially outermost portion of the cam surfaces may be squared off which is an easier contour to machine with a conventional milling tool. When the work piece has been inserted, the lever 5 (FIG. 1) is manually pulled rearwardly until the mechanism assumes the position shown in FIG. 3 in which the closer sleeve 13 abuts the back plate 22 which serves as a rear stop. During the transition from the position shown in FIG. 2 to that shown in FIG. 3, the link 25 moves to the horizontal position with a substantial proportion of the travel constituting a pivotal motion about a radius point 29 and along the frusto-conical portion 21 of the hub 19 before it assumes the horizontal position. Hence, a toggle action is achieved as the rollers 27 move inwardly, and a slight rearward movement is imparted through the toggle links 25 to the back plate 22 to pull the draw tube and the collet 14 slightly rearwardly. As a result, the tapered portion 30 of the collet slides along the correspondingly tapered portion 31 of the spindle to spring the jaws of the collet inwardly thereby clasping the bar stock for the machining operation contemplated.

When the machining operation is completed, the lever 5 is thrown in a forward direction causing the mechanism to again assume the position depicted in FIG. 2. During the transition from the position shown in FIG. 3 to that shown in FIG. 2, the rollers 27 are caused to roll up the angled straight portion of the cam surface 28 to resume their position within the respective arcuate portions of the cam surface. The length of the toggle links 25 are predetermined to transmit a slight forward motion to the back plate 22 during the last portion of the forward travel of the closer sleeve 13. This slight forward motion is transmitted through the draw tube 16 to the collet 14 to relieve the pressure from the tapered portion 30 of the collet. In addition, the inertia of the closer mechanism provides an impact which overcomes the static friction between the collet taper and the spindle taper. The jaws of the collet 14 are then free to spring slightly radially outwardly to permit removal of the work piece which has been operated upon and insertion of a new work piece.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:
1. Apparatus for selectively securing and releasing a threaded collet for a lathe or similar machine comprising:
   a. a spindle having an axial bore;
   b. a draw tube dimensioned to fit closely within said axial bore and having an internally threaded first end for threaded engagement with the threaded terminus of a collet,
      1. said draw tube having a reduced outer diameter portion commencing at its second end and extending a predetermined distance toward said first end and terminating in an exterior annular shoulder;
   c. a closer sleeve having an axial bore slightly larger than the outer diameter of said draw tube such that said closer sleeve may be slidably engaged with said draw tube,
      1. said closer sleeve including a plurality of equally circumferentially disposed cam surfaces of identical contour extending generally outwardly from the periphery of its said axial bore,
      2. the contour of each of said cam surfaces described with respect to a plane perpendicular to one of said cam surfaces and passing through the axis of said closer sleeve comprising a radially outermost portion, a first straight portion extending from the forwardmost terminus of said radially outermost portion, said first straight portion being disposed parallel to the axis of said closer sleeve, and a second straight portion extending downwardly and forwardly from the rearmost terminus of said radially outermost portion and extending to the longitudinal bore through said closer sleeve;
   d. first stop means for limiting the relative forward motion toward the collet of said closer sleeve on said draw tube,
      1. said first stop means including a generally cylindrical hub portion with an outer diameter less than twice the radial distance between the axis of said closer sleeve and said first straight cam portion such that said hub portion of said first stop means may be introduced into a circumferential recess partially defined by said first straight cam surfaces,
      2. the rearmost surface of said hub portion being disposed in a plane to which the axis of said hub is normal and comprising a third cam surface,
      3. a fourth cam surface comprising a frusto-conical surface extending between the circumferentially outer terminus of said third cam surface and the rearward terminus of said cylindrical portion of said hub;
   e. second stop means for limiting the relative rearward motion of said closer sleeve away from the collet, said second stop means having a generally cylindrical outermost surface and a concentric bore slightly larger than the diameter of said reduced diameter portion of said draw tube such that said second stop means may be introduced onto said reduced diameter portion of said draw tube and seated in its forwardmost position against said shoulder on said draw tube, said second stop means including a plurality of equally circumferentially spaced recesses opening forwardly,
      1. a plurality of toggle links, each of said toggle links pivotally secured at one end in one of said plurality of recesses in said second stop means, said plurality of toggle links corresponding in number and angular distribution to said plurality of cam surfaces in said closer sleeve, each of said toggle links having a forwardly projecting free end including a roller for engagement with said cam surfaces on said closer sleeve and on said hub according to the relative longitudinal positions of said closer sleeve and said second stop means; and
   f. means for selectively moving said closer sleeve against said first stop means and against said second stop means such that said rollers follow said cam surfaces to force said free ends of said toggle links to move away from and toward the axis of said draw tube and slightly forwardly and rearwardly to move said draw tube slightly forwardly and rearwardly and correspondingly tighten and loosen said collet in said spindle.

2. The apparatus of claim 1 in which said radially outermost portions of said cam surfaces have arcuate contours.

3. The apparatus of claim 2 in which there are three of said cam surfaces distributed 120° apart.

* * * * *